United States Patent [19]
Lohl et al.

[11] 3,836,932
[45] Sept. 17, 1974

[54] PHOTOGRAPHIC CAMERA WITH INTERCHANGEABLE FILM SYSTEM

[75] Inventors: Günter Lohl, Wetzlar; Wolfgang Schneider, Braunfels; Heinz Schröder, Steindorf; Rudolf Noack, Wetzlar, all of Germany

[73] Assignee: Firma Ernst Leitz GmbH, Wetzlar, Germany

[22] Filed: Nov. 9, 1973

[21] Appl. No.: 414,232

[30] Foreign Application Priority Data
Nov. 14, 1972  Germany............................ 2255661

[52] U.S. Cl.................... 354/159, 355/73, 352/79, 352/80, 352/226
[51] Int. Cl.... G03b 1/50, G03b 27/60, G03b 19/00
[58] Field of Search ............... 354/159; 355/73, 76; 352/79, 80, 226

[56] References Cited
UNITED STATES PATENTS

| | | | |
|---|---|---|---|
| 2,885,925 | 5/1959 | Vezzi | 352/226 |
| 3,395,965 | 8/1968 | Teshi et al. | 352/79 X |
| 3,610,751 | 10/1971 | Miyauchi | 355/73 |

*Primary Examiner*—Robert P. Greiner
*Attorney, Agent, or Firm*—Krafft & Wells

[57] ABSTRACT

A photographic camera having a film-changing and multi-circuit vacuum system, especially for application in process photography. The improvements include:
  guides for the use of arbitrary film widths provided in the camera;
  a film plate to accommodate the seating of the largest anticipated film width and having at least two centering pins for each film container;
  a couple for each film container centered between the centering pins forming a connection between the camera drive and the film container for film transport; and
  interchangeable bridging members located on the centering pins which couple both the couples and the film containers so that any kind of film width and film container which fits on the film plate may be used.

22 Claims, 11 Drawing Figures

Fig. 11

PHOTOGRAPHIC CAMERA WITH INTERCHANGEABLE FILM SYSTEM

BACKGROUND OF THE INVENTION

The field of the invention is photographic cameras having an interchangeable film system and a multi-circuit vacuum support system for application especially in process photography.

The state of the art of interchangeable film systems may be ascertained by reference to West German Published Application No. 2,043,240 and the state of art of vacuum board film supports may be ascertained by reference to U.S. Pat. No. 2,933,014 and West German Pat. No. 1,187,122 and the disclosures of these patent publications are incorporated herein.

Such a film changer together with the multi-circuit vacuum system used in photographic equipment of this kind has as an object the improved efficiency in the use of film and the subsequent processing. This object is achieved by creating the feasibility of supplying corresponding film widths for various film lengths and film containers (rolls, cassettes, etc.).

The use of photographic equipment incorporating the film to be illuminated either on a supply reel or in supply cassettes is already known.

Furthermore, proposals have been advanced regarding multi-format cameras in order to make use of adjustable or interchangeable image masks, or to design the image window support together with the film track and film transport reel or roll in interchangeable manner.

West German Published Application No. 2,043,240 further describes a camera wherein a movably supported format stop, because of its motion required for a change of format causes the optical center of the photographic objective to move into the image window center corresponding to the particular format setting.

It is furthermore known to so design a multi-circuit or multiloop vacuum systems for holding films in enlarging equipment so that the closed-circuit lines connected to the suction apertures may be switched off in part or in whole from the evacuation pump by means of stopcocks activated from adjustable valves coupled to the film register or support.

A vacuum board film support is further described in U.S. Pat. No. 2,933,014 and in German Pat. No. 1,187,122 wherein there is no suction loss when film formats smaller than that of the film holder are used, and presumably they provide flawless film adhesion.

According to the present state of the art, photographic cameras have been made only for films of one width and for two different image formats.

Furthermore, the vacuum board film support systems described in relation to the enlargers are the only kinds that ensure vacuum holding for a plurality of films of different formats. Complete efficacy of vacuum support seems questionable with respect to the vacuum film supports disclosed in U.S. Pat. No. 2,933,014 and German Pat. No. 1,187,122.

SUMMARY OF THE INVENTION

Having in mind the limitations of the prior art it is an object of the present invention to provide a photographic camera of the kind described with means allowing improved utilization of the film while using different format reproductions, by making use of corresponding film widths, and to further improve the selection of various lengths and containers of film, said means being suited to switch on the appropriate vacuum suction corresponding to the particular film width.

According to the present invention, these objects are achieved in that the photographic camera is provided with guidance means for using films of arbitrary widths; the emulsion carrier support plate is designed for receiving the largest cassette-housed film width to be expected and provided with at least two centering pins for each film container; coupling means are provided midway between the centering pins of each film container and the required connection for film transport from camera drive to the film packs is provided and furthermore exchangeable bridging members that may be slipped over the centering pins are provided, which are coupled both to the coupling means and to the film containers. As a result of these constructions any kind of film width and any kind of film fitting on the plate can be utilizable.

One guidance means is appropriately made of a pressure plate accepting the largest film width under consideration, pivoting about a joint and, according to a design known per se of multi-loop vacuum systems, being provided with suction apertures and circulatory lines.

In a further embodiment of the present invention, the circulatory lines of the support plate are provided with a gating system actuated by suitable adjusting or setting means, so that the branches of the multi-loop vacuum system corresponding to the film width being used may be switched into the evacuation flow.

It is proposed with respect to the above that the gating system preferably be equipped with one or several mechanical or electromechanical sliders, said setting means for these sliders preferably consisting of one or several electromagnets switched on or off depending on need.

Provision is furthermore made for a further guidance means consisting of an interchangeable format plate with an image window, which will be slipped onto the mirror housing of the camera and this is provided with a handle for ease of changing.

It is furthermore advantageous that the format plate also be designed to receive format masks known per se and thereby allow for reproduction formats smaller than the image window of the format plate.

Again, in another embodiment, the format plate be provided with cam actuating switches which during the format plate changing program turn the electromagnets on or off in order to move the gating system.

In yet another embodiment of the present invention the centering pins are provided with flanges at the ends above the plate, the height of these flanges is adjusted to position the film center with respect to the center of the image windows of the format plates and the film containers or the bridging members rest on these flanges and preferably the shanks of the centering pins are made elastic, for instance by means of slits, in order to achieve seating and centering of the film containers and bridging members without suffering from play.

In a further embodiment of the invention, the coupling means consists of a driver claw and a spur gear, the latter being provided with a shank in the form of a hollow axle that rigidly connects the spur gear and the driver claw. This set is rotatably supported on a spacer bolt mounted in the film receiving plate and is prevented from moving axially.

Appropriately, the driver claw is axially movable on the axle, though prevented from rotating by itself, in order to be elastically coupled to the interchangeable bridging members and/or the film containers. Preferably, the driver claw is spring-compressed, by a means such as a cup spring, against the head of a plug mounted in the spacer bolt and securing the end position of the driver claw.

The bridging members essentially consist of a bridge part, of two centering bushings mounted on the latter and separated by the distance between the centering bolts, of a pinion coupled to the driver claw of the camera, and of coupling components operating in combination with the drive axles of the film containers and connected to the pinion.

Provision is made for the coupling component operating together with the drive axle of the roll of the widest film being in the form of an axle with various cross-sections in the longitudinal direction, which is rotatably supported in the bridge part and rigidly connected to the pinion and therefore fixed with respect to the axial direction.

Special emphasis in this respect is made that the axle be provided with a cross-section deviating from the cylindrical shape, preferably in the form of a polygon, in the coupling region.

It is further proposed to design the coupling means operating together with the reel drive axle of a narrower film container as an axle consisting of two parts differing as regards cross-sections along the longitudinal direction, supported in the bridge part, rigidly connected with the pinion and hence fixed in the axial direction.

Considering the above, provision is made for a flange at the lower end of the axle which is connected to the pinion, the reel of the lesser or narrower film resting against this flange. Tangential surfaces are provided at that part of the axle immediately projecting beyond the flange for carrying the reels and the upper axle end is provided with a safety lever located in a slot and tiltable in the axial direction about a hinge pin in order to secure the reel.

The coupling component operating together with the drive axle of the film storage is provided with an axle connected to the pinion and rotatable in the bridge part, but axially fixed, and furthermore with a driver claw axially movable on that axle but prevented from rotating on its own. Essentially, this coupling component operates as the coupling means of the film.

It is further recommended that one centering bolt be mounted above the centering bushing fastened to the bridge member for a narrower cassette film, each such centering bolt corresponding in design and purpose to those located in the film plate.

An essential characteristic of the invention consists in so adjusting the bridging members that the center of any particular film being used will coincide with that of the image window of the format plate being used, because of the common operation of said bridging members with the centering pins mounted in the film plate.

BRIEF DESCRIPTION OF THE DRAWINGS

The invention may best be described by reference to the appended drawings showing an embodiment thereof wherein.

DESCRIPTION OF THE PREFERRED EMBODIMENTS

Figure 1:
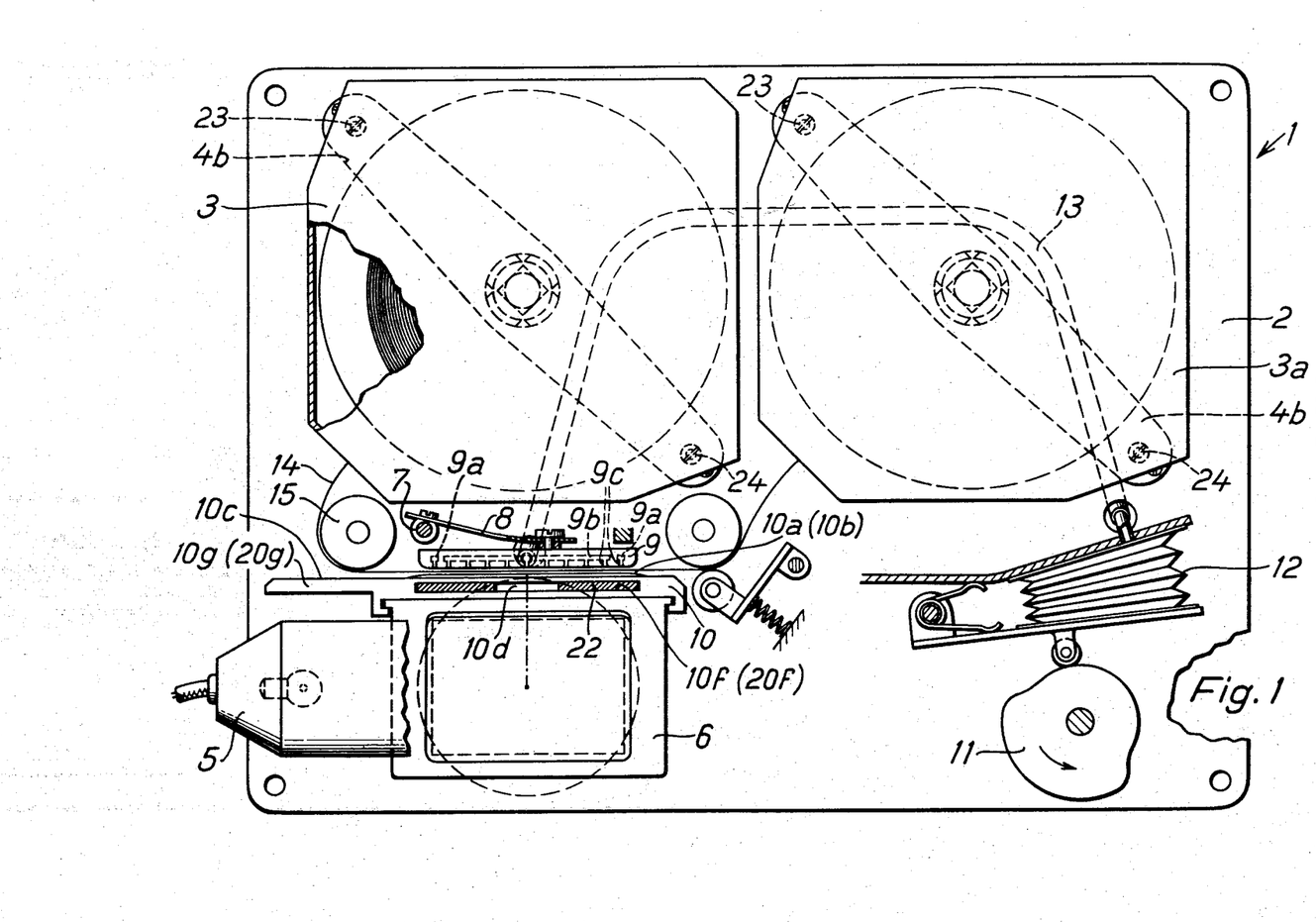
FIG. 1 is a diagram of the film plate, of the guidance means and of the vacuum system, all in plan view.

FIG. 1 shows a film plate 2 of a camera 1, bridging members 4b supplied with film cassettes 3 and 3a being mounted on said film plate. Lamp housing 5 is combined with mirror housing 6 and comprssion plate 9 pivots about a hinge 7 and is subject to loading from strip-spring 8, and together with format plate 10 forms the film guide. A bellows 12 activated by cam 11 is connected to compression plate 9 by a flexible hose 13.

Figure 11:
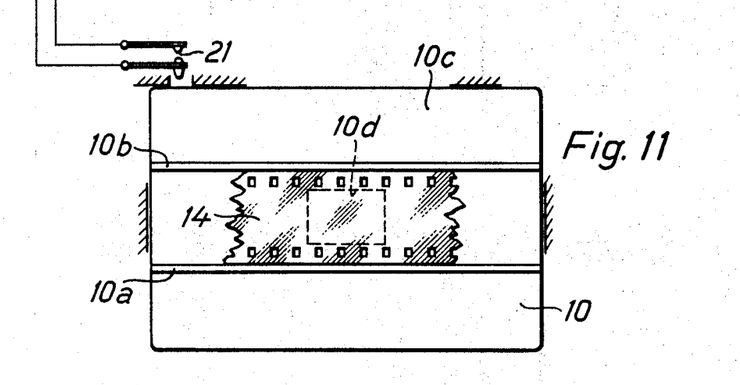
FIG. 11 is a diagrammatic representation of a format plate without contact in plan view.

Film 14 is removed from cassette 3 for exposure and, on its path toward 3a, the film will be guided around a roller 15 between the compression plate 9 and format plate 10. The latter is provided with guide tracks 10a and 10b for lateral guidance of film 14, said tracks forming a channel shallower than the thickness of the film (see FIG. 11), the surface 10c of said tracks facing film 14 representing the image or film plane of camera 1. Compression plate 9 simultaneously pivots about hinge 7, compressing guide tracks 10a and 10b of format plate 10 by spring loading and pressing film 14 against film plate 10c.

Figure 9:
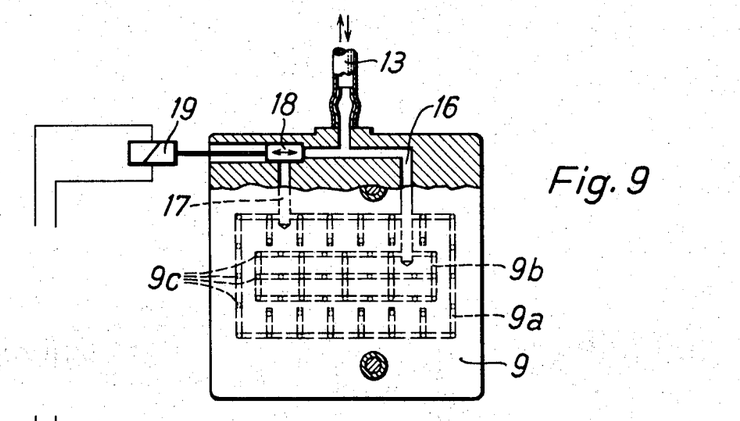
FIG. 9 is a diagrammatic representation of the multi-circuit vacuum system and of the gating system in the compression plate in plan view.

An evacuation air flow is also generated by bellows 12 actuated by cam 11, said flow communicating via hose 13 with compression plate 9, whence it is distributed through supply lines 16 and 17 to the evacuation apertures 9c interconnected by lines 9a and 9b (FIG. 9).

Since film 14 lying against compression plate 9 hampers the evacuation air flow at evacuation or vacuum apertures 9c, the film is sucked against the compression plate and thereby improvement of the film flattening in film plane 10c is achieved.

In order not to suffer a loss in suction effectiveness when a film is used which fails to cover the entire evacuation surface, line 17 is sealed by means of a slider 18 activated by an electromagnet 19 (FIG. 9), which is turned on or off as follows:

Format plate 10 shown together with compression plate 9 as the film guide may be slipped on mirror housing 6, that is, it is interchangeable. In the example shown in this particular embodiment, it is being changed for a format plate 20 accepting a wider film 14

Figure 10:
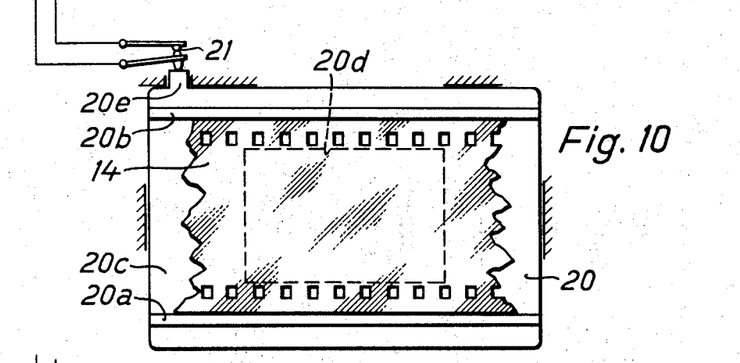
FIG. 10 is a diagrammatic representation of a format plate with contact in plan view.

(FIG. 10). Surface 20c of format plte 20 when on mirror housing 6 also represents the film plane. Film 14 is guided laterally by guide tracks 20a and 20b forming a channel which is shallower than the film's thickness. Format plate 20 furthermore is provided with a projecting cam 20e activating a switch 21 when the format plate 20 is moved on mirror housing 6, said switch connecting magnet 19 to a power source not shown. Slider 18 is withdrawn from line 17 and the closed line 9a thereby is connected to vacuum (FIG. 9).

Image windows 10d and 20d in format plates 10 and 20 determine a predetermined reproduction format for the particular film 14 being used and this format may be reduced arbitrarily. To that end, format plates 20 and 10 are provided with seating slits 10f and 20f accepting format masks 22 known per se which will be inserted in sliding manner.

Both format plates 10 and 20 are provided with handles 10g and 20g resp. for ease of changing.

Film plate 2 of camera 1 is designed for seating and transporting the widest expected cassette-loaded film.

Figures 2, 3:
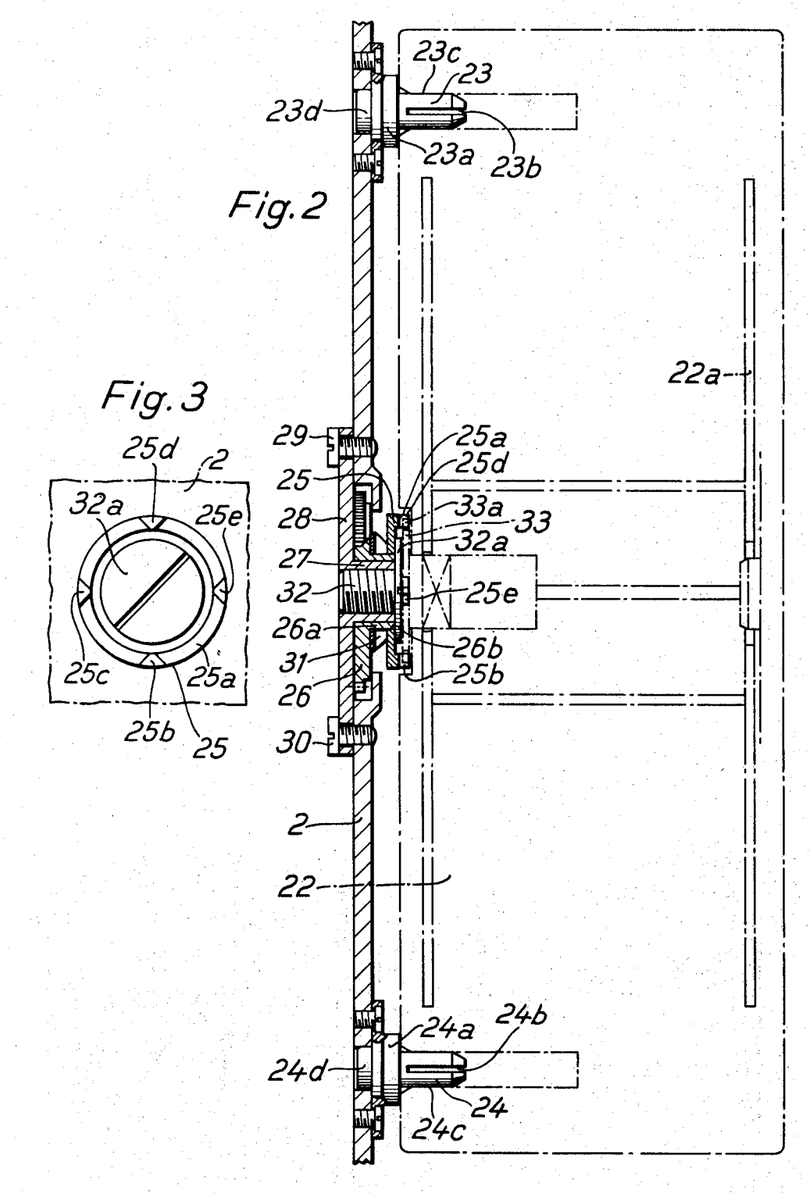
FIG. 2 is a diagram of a film plate with inserted film cassette, in side view.
FIG. 3 shows the driver claw of FIG. 2 in detail.

FIG. 2 shows a cassette 22 in dot-dash lines, held by positioning pins 23 and 24 mounted in film plate 1. Flanges 23a and 24a mounted on pins 23 and 24 ensure the precise seating of the film 14 stored at the center of the cassette 22 with respect to the image window center of format plates 10 and 20. Spring loading slits 23b and 24b are provided for in shanks 23c and 24c of positioning pins 23 and 24 in order to achieve seating and centering of cassette 22 without play.

The connection between camera drive and cassette reel 22a is implemented by a driver claw 25 and a spur gear 26 equipped with a shank 26a, and spur gear 26 together with shank 26a rotating about a spacer bolt 27 mounted to film plate 2 by its flange 28 held by screws 29 and 30.

Shank 26a of spur gear 26 is provided with at least one tangential surface at its free end 26b facing the cassette 22, so that the corresponding designed driver claw 25 may move in axial direction but is secured with respect to rotation on shank 26a.

In order to obtain elastic coupling with respect to the axial direction of cassette reel 22a, driver claw 25 will be pressed by a cup spring 31 or the like surrounding shank 26a of spur gear 26 in the direction of cassette 22. In order to secure the axial end position of the driver claw, a threaded plug 32 with wide head 32a is screwed into spacer bolt 27 (also see FIG. 4).

Spur gear 26 mates with another of the camera drive. Power transmission to cassette reel 22a occurs by means of driver claw 25 connected via shank 26a with spur gear 26, said driver, by means of triangularly designed claws 25b–e mounted on face 25a, reaching into correspondingly designed recesses 33a of a coupling pinion 33 (FIG. 8) connected to cassette reel 22.

As already clear from FIG. 1, camera 1 may also be used for other types of film containers and film widths by using bridging members 4, 4a and 4b.

Figure 4:
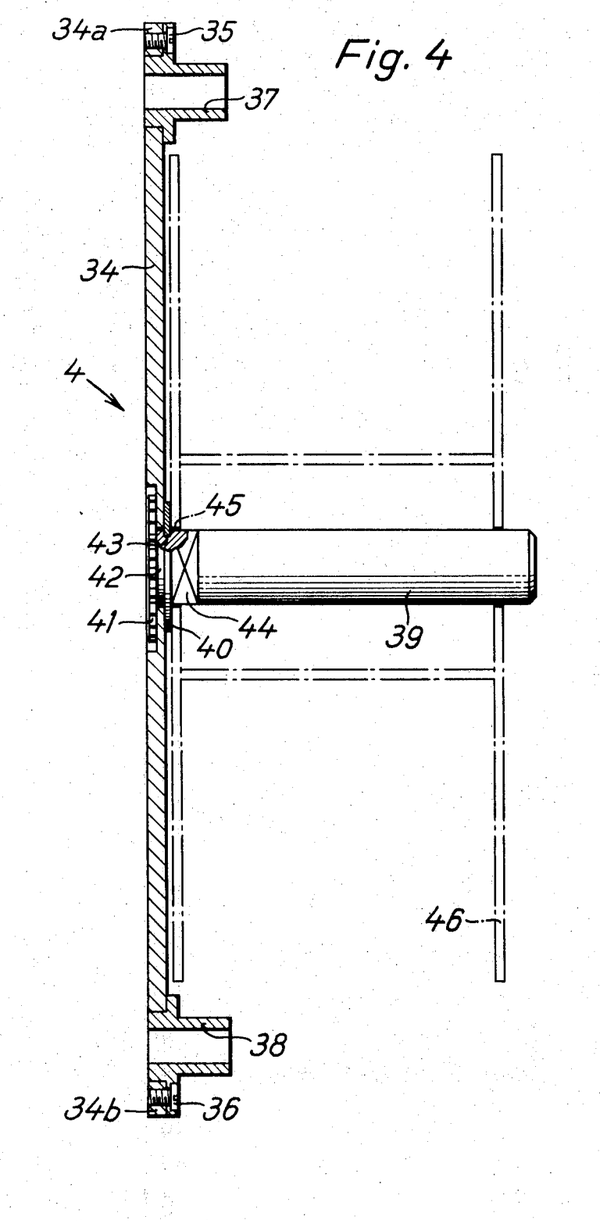
FIG. 4 is a section through the bridging member of FIG. 1 for the widest film roll or reel.
Figures 7, 8:
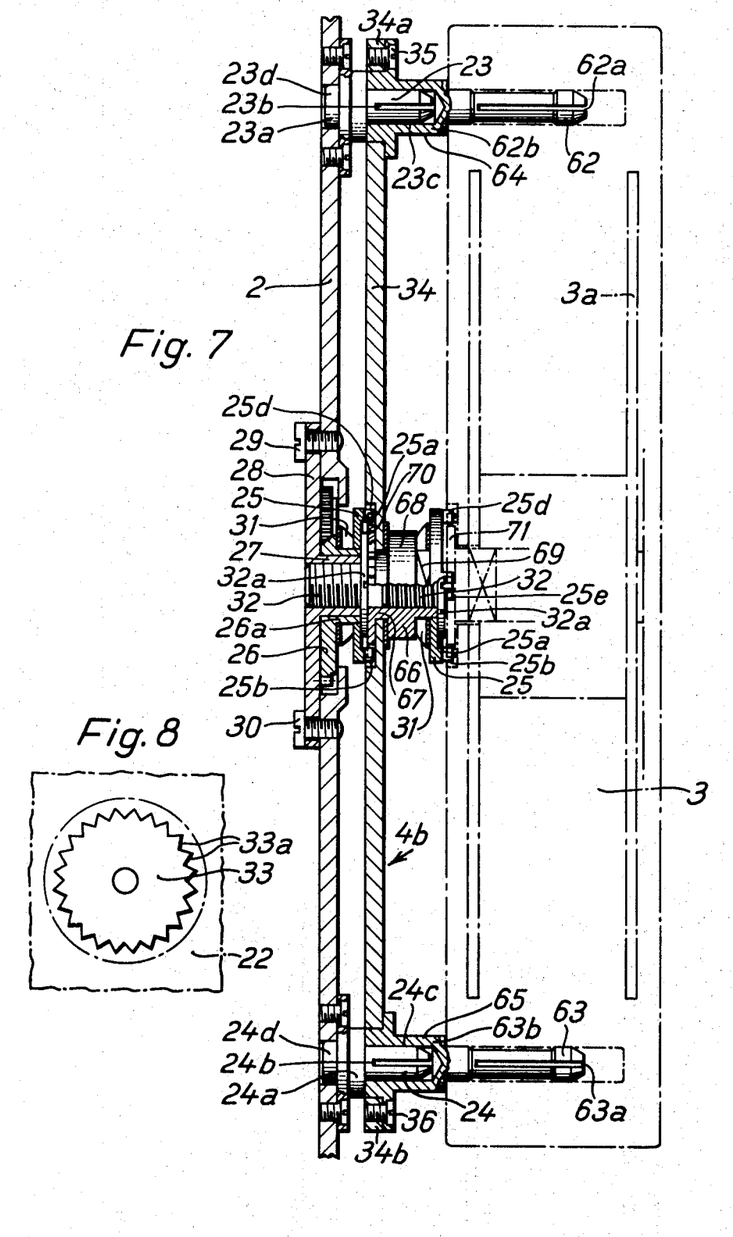
FIG. 7 is a side view section of FIG. 1 of a diagrammatic form of a film plate with bridging member for cassette contained film.
FIG. 8 is a detailed view of the pinion of FIG. 7.

FIG. 4 shows a bridging member 4 for the widest anticipated film 14. The reel is designated 46. The bridging member consists of a bridge part 34 provided at both ends 34a and 34b with centering bushings 37 & 38 each secured by screws 35 and 36 and separated by the distance between positioning pins 23 and 24 mounted in film plate 2. An axle 39 is mounted centrally between the centering bushings 37 and 38 and corresponding to the position of coupling means 25 and 26, said axle being rotatable but fixed in the axial direction on account of a securing disk 40, and supported on the bridge part 34. Pinion 41 of the axle is seated in countersunk manner in bridge part 34 and is designed as shown in FIG. 8. Pinion 41 passes into a cylindrical shank 42, by means of which axle 39 will rotatably rest in bridge part 34, the height of said shank being limited by a recess 43 and being so adjusted that the penetrating securing disk 40 will allow only as much axial play as is needed for rotation. Axle 39 takes the form of a tetragonal shaft 44 above recess 43 penetrating a corresponding tetragonal hole 45 in reel 46 in order to drive the latter upon rotation of axle 39. The cylindrical shank of axle 39 extending beyond the tetragonal shaft 44 is used to center the reel 46.

When bridging members 4 and their centering bushings 37 and 38 are lowered on positioning pins 23 and 24, as shown in FIGS. 1 and 2, the triangular claws 25b–e of driver 25 will mate and couple with recesses 33a of pinion 41, provided bridging member 4 is pressed down to flanges 23a and 24a of positioning pins 23 and 24.

Figures 5, 6:
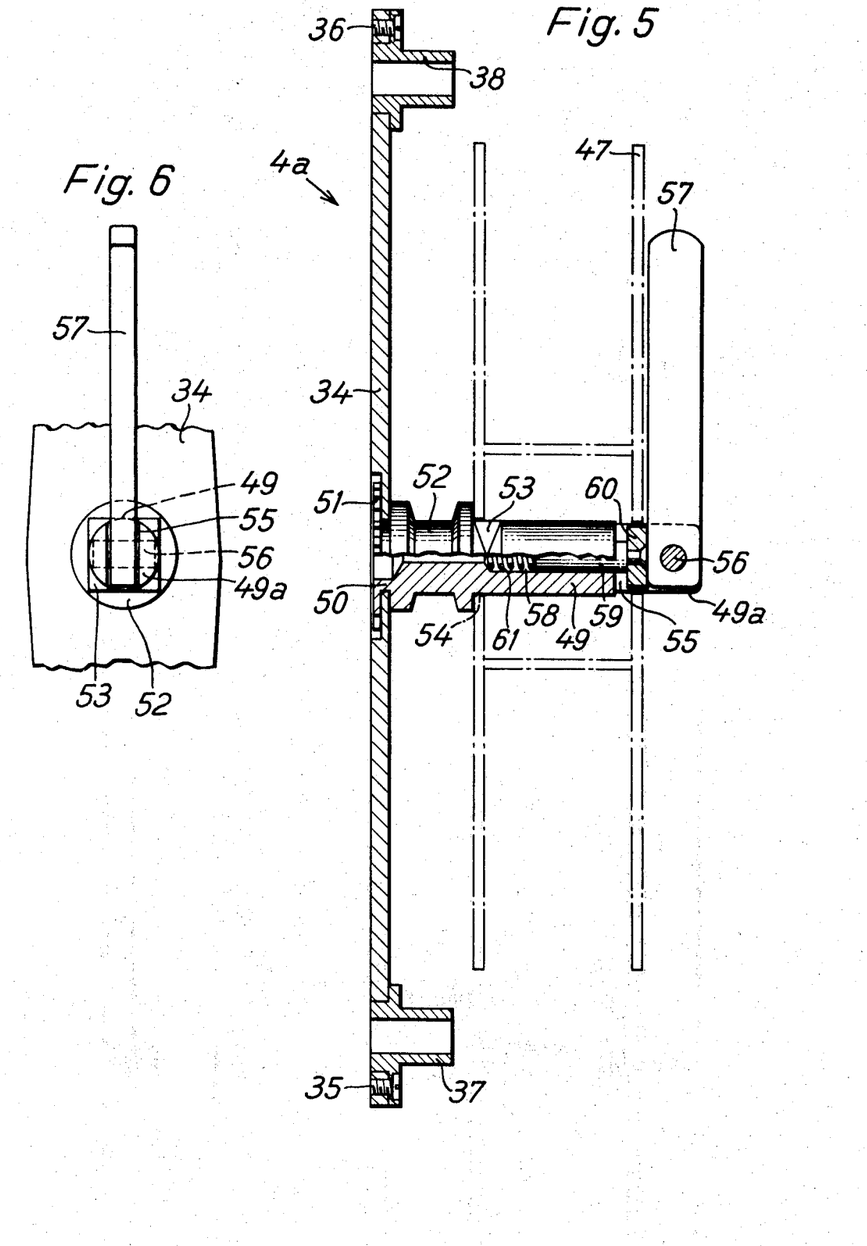
FIG. 5 is a section through the bridging member of FIG. 1 of a smaller film roll.
FIG. 6 is a plan view cutaway from FIG. 5.

A bridging member 4a is shown in FIGS. 5 and 6, which allows using a narrower film 14 on a reel or roll 47. This bridging member consists of a bridge part 34, on which are mounted centering bushings 37 and 38 and screws 35 and 36, as described for FIG. 4. An axle 49 mounted at the center of centering bushings 37 and 38 corresponds to coupling means 25 and 26 in the film plate 2. It is provided with various cross-sections in longitude and consists of two parts. This axle is rotatably supported in bridge part 34 by means of a cylindrical shank 50 and is secured with respect to axial displacement by means of a pinion 51, with which it is connected and corresponds in design to coupling pinion 51, and by means of a profiled flange 52 mounted on the cylindrical shank 50.

A tetragonal shaft 53 extends from the profiled flange 52 and axle 49 penetrates a corresponding tetragonal hole 54 by means of said tetragonal shaft, thus driving reel 47 when rotating.

The cylindrical part of axle 49 beyond the four-cornered shaft is provided with a slit 55 at its upper end 49a and a hinging pin 56 serves as fulcrum for a flat securing lever 57 to maintain reel 47 inserted on axle 49.

To prevent undesired removal of securing lever 57 from the securing position, axle 49 is provided with a cylindrical bore 58 supporting a spring loaded bolt 59 with a flat head 60 guided by slit 55, said spring loaded bolt being kept against lever 57 by a compression spring of helical shape 61 in order to lock the securing position.

If the bridging member 4a and its centering bushings 37 and 38 are so set on the positioning pins 23 and 24 as to be resting on flanges 23a and 24a, then the triangular claws 25b–e of driver 25 will mate and couple with the recesses 33a of pinion 51. The adjustment of flanges 23a and 24a furthermore ensures that the center of the narrower films 14 will lie in the image window center of format plate 10.

The use of a narrower cassette-loaded film 14 in camera 1 is made feasible by means of the bridging member 4b shown in FIG. 7. Said bridging member, in similarity with those shown in FIGS. 4 and 5, i.e., members 4 and 4a, consists of bridge part 34 provided with centering bushings 64 and 65 held by screws 35 and 36 at extremities 34a and 34b, said bushings holding the centering pins 62 and 63.

As shown in FIG. 7, an axle 66 is located midway between centering pins 62 and 63 and the axle consists of a trunnion 67, a flange 68 and a tetragonal bolt 69. Axle 66 is rotatably supported in bridge part 34 by means of trunnion 67. Axle 66 is secured against axial displacement by means of a pinion press-fitted on one end of trunnion 67 and corresponding in design to the coupling pinion 33, and by means of flange 68.

A previously described driver claw set 25 slides on the tetragonal bolt 69. The driver claw set is displaced in the direction of cassette 3 by means of a cup spring 31 or the like and is secured in its end position by a threaded plug 32 with wide head 32a screwed into axle 66.

When the cassette 3 loaded with the narrower film 14 is placed on centering pins 62 and 63 — which are provided with slits 62a and 63a in order to maintain cassette 3 in place without play — a coupling pinion 71 from cassette 3 couples with the driver claw set 25 and ensures the driving of cassette reel 3a.

Truing the film center with that of image window 10d in format plate 10 is accomplished by appropriately placing cassette 3 on the flanges 62b and 63b which are adjusted with respect to image window center and by suitably placing the briding member 4b on flanges 23a and 24a of the positioning pins 23 and 24.

We claim:

1. In a photographic camera having a film-changing system, a vacuum board film support connected to a multi-circuit system and a film plate for mounting film containers, the improvement comprising:
   means for guiding film of variable widths provided in the camera;
   said film plate having a given size to accommodate the width extremity of said film and having a plurality of centering pins projecting from said film plate for mounting said film containers;
   coupling means mounted in said film plate between said centering pins providing a connection between a first drive in said camera and a second drive in said film container for transport of said film; and
   interchangeable briding members mounted on said centering pins coupling said coupling means and said film containers whereby variable film widths and film container sizes are accommodated.

2. The photographic camera of claim 1, wherein said vacuum board film support is a compression plate (9) having suction apertures (9c) connected to said multi-circuit vacuum system, having vacuum lines closing on themselves (9a, 9b) said compression plate having pivot means and means for accommodating variable film widths.

3. The photographic camera of claim 2, wherein said vacuum lines (9a, 9b) have gating means (18) activated by setting means (19), said gating means switching a portion of said vacuum lines in or out of suction flow depending on the film width being used.

4. The photographic camera of claim 3, wherein said gating means are mechanically actuated sliders (18).

5. The photographic camera of claim 3, wherein said gating means are electromechanically actuated sliders (18).

6. The photograhic camera of claim 3, wherein said gating means are actuated by setting means (19).

7. The photographic camera of claim 6, wherein said setting means are electromagnetic switches (19).

8. The photographic camera of claim 7, having a mirror housing (6) in said camera, said means for guiding film including a format plate (10, 20) located on said mirror housing and having an image window (10d, 20d) therein and said format plate having a handle (10g, 20g) facilitating a change-over procedure.

9. The photographic camera of claim 8, wherein said format plate (10, 20) has means for seating format limiting masks (22) facilitating reproduction formats smaller than said image window (10d, 20d) of said format plate (10, 20).

10. The photographic camera of claim 8, wherein said format plate (20) is provided with cams (20e) activating switches (21) which in turn are connected to said electromagnetic switches (19) to move said gating means (18) during the change-over procedure of said format plate (20).

11. The photographic camera of claim 8, wherein said centering pins (23, 24) are provided with flanges (23a, 24a) above the lower extremities (23d, 24d) of said centering pins, said flanges supporting said film containers and said bridging members and having a given height to secure the position of the film center with respect to the center of said image window.

12. The photographic camera of claim 11, wherein said centering pins (23, 24) have shanks (23c, 24c) adapted to be spring loaded in the radial direction in order to provide play-less seating and centering of said film containers and said bridging members.

13. The photographic camera of claim 1, wherein said coupling means comprise a spur gear (26) provided with a shank (26a) defined by a hollow axle, said shank rigidly connected to said spur gear (26) and a driver claw set (25), said hollow axle is fixed in the axial direction but rotatably mounted on a spacer bolt (27) which in turn is mounted on said film plate (2).

14. The photographic camera of claim 13, wherein said spacer bolt (27) has a threaded plug (32) mounted therein having a head (32a) and a spring biasing said head and said driver claw set (25) to movably support said shank in axial direction while preventing rotation on its own and providing an elastic coupling with said bridging members and said film containers.

15. The photographic camera of claim 1, wherein said bridging members comprise a bridge part (34), two centering bushings (37, 38), mounted on said bridge part separated by the distance between said centering pins, a pinion (41) coupling a driver claw set (25) of said camera and a coupling component connected to said pinion (41) and operatively connected to said film containers.

16. The photographic camera of claim 15, wherein said coupling component connects with a drive axle (39), a reel (46) accommodating a predetermined film width, said drive axle (39) having different cross sectional shape in longitude, said drive axle rotatably mounted in bridge part (34) of said briding members and rigidly connected with pinion (41) and fixed in axial direction.

17. The photographic camera of claim 16, wherein said axle (39) has a polygonal cross sectional shape (44).

18. The photographic camera of claim 15, wherein said coupling component connects with said drive axle (39) a correspondingly shaped reel accommodating narrow film widths, said drive axle comprising a dual axle (49) having different cross sectional shapes with respect to the longitudinal axis and said drive axle is rotatably mounted in bridge part (34) of said bridging members and rigidly connected with pinion (51) and fixed in axial direction.

19. The photographic camera of claim 18, wherein axle (49) has a lower, cylindrical end (50) provided with a flange (52) supporting said reel (47), tangential surfaces for driving said reel (47) are provided above said flange on a part (54) of said axle (49) projecting beyond said flange, and said axle (49) has an upper end (49a) provided with a securing lever (57) located in a slit (55) tipped over a hinge pin (56) for securing said reel (47) in axial direction.

20. The photographic camera of claim 18, wherein said coupling component connects with a drive axle (71) of a cassette-loaded film (14), said drive axle comprising an axially fixed axle (66) connected with a pinion (33) and rotatably supported in a bridge part (34) of said bridging members, a driver claw set axially movable on said fixed axle (66) but secured against rotating on its own.

21. The photographic camera of claim 20, wherein centering bushings (64, 65) are fastened to bridge part (34) and centering bolts (62, 63) are mounted above said centering bushings.

22. The photographic camera of claim 21, wherein said bridge part is connected to said centering pins to center said film over an image window (10d, 20d) of a format plate (10, 20) of said camera.

* * * * *